United States Patent Office.

WILLIAM E. CHILSON, OF TROY, PENNSYLVANIA.

Letters Patent No. 111,044, dated January 17, 1871.

IMPROVEMENT IN MEDICAL COMPOUND PILLS FOR CURE OF COLDS, &c.

The Schedule referred to in these Letters Patent and making part of the same.

*To all whom it may concern:*

Be it known that I, WILLIAM E. CHILSON, of Troy, in the county of Bradford and State of Pennsylvania, have invented a new and useful Medical Compound for Pills for the Cure of Colds, Coughs, &c.; and I do hereby declare the following specification to be a full, clear, and exact description thereof:

My invention consists in the novel combination of ipecac, sweet oil, simple sirup, and honey, compounded substantially as follows:

Of powdered ipecac, one pound, (1 lb.)

Of sweet oil, one ounce, (1 oz.)

These are to be well mixed, after which is added one-half the whole weight of simple sirup, and honey of about equal quantities. After having been thoroughly mixed in any of the modes well known to the art, the mixture should be allowed to stand in a warm place for a few hours, and then rolled out into pills in the well-known manner, and powdered with liquorice-root or other suitable flouring matter. The sweet oil acts not only as a gentle cathartic, but, uniting with the ipecac, serves to preserve its medicinal properties, and when well dried renders the pills almost tasteless while being administered. By the addition of the sweet oil and simple sirup together with the honey, the cathartic properties of the ipecac are fully developed, while the powdered liquorice-root, when applied to the pills, gives them a very pleasant taste.

My improved compound will be found an efficient and safe remedy for the cure of colds, coughs, and the like; being made into pills, it is easily administered, while the simplicity of the composition will recommend itself to all.

My compound will be known and designated as "Sirup Pills."

Having thus described my invention,

I claim as new and desire to secure by Letters Patent—

The within-described medical compound for pills, composed of the ingredients named, substantially as and for the purposes specified.

WILLIAM E. CHILSON.

Witnesses:
ISAAC J. McKEAN,
S. O. DOANE.